United States Patent
Vijaya Kumar et al.

(10) Patent No.: US 12,240,474 B2
(45) Date of Patent: Mar. 4, 2025

(54) SYSTEM AND METHOD FOR CORRECTING IN REAL-TIME AN ESTIMATED POSITION OF A ROAD OBJECT

(71) Applicant: GM Global Technology Operations LLC, Detroit, MI (US)

(72) Inventors: Vivek Vijaya Kumar, Shelby Township, MI (US); Bo Yu, Troy, MI (US); Donald K. Grimm, Utica, MI (US); Fan Bai, Ann Arbor, MI (US); Joon Hwang, Pflugerville, TX (US); Carl P. Darukhanavala, Royal Oak, MI (US); Carolyn Heather MacLeod, Thornhill (CA); Muhammad Rehan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 18/061,612

(22) Filed: Dec. 5, 2022

(65) Prior Publication Data
US 2024/0182045 A1    Jun. 6, 2024

(51) Int. Cl.
*B60W 50/02* (2012.01)
*B60W 50/06* (2006.01)
*G01S 17/86* (2020.01)
*G01S 19/48* (2010.01)
*G06T 7/70* (2017.01)

(52) U.S. Cl.
CPC ........ *B60W 50/0205* (2013.01); *B60W 50/06* (2013.01); *G01S 17/86* (2020.01); *G01S 19/485* (2020.05); *G06T 7/70* (2017.01); *B60W 2420/408* (2024.01); *B60W 2520/00* (2013.01); *B60W 2554/802* (2020.02); *B60W 2555/20* (2020.02); *G06T 2207/30252* (2013.01)

(58) Field of Classification Search
CPC ... B60W 50/0205; B60W 50/06; G01S 17/86; G01S 19/485; G06T 7/70
See application file for complete search history.

(56) References Cited

U.S. PATENT DOCUMENTS

| | | | |
|---|---|---|---|
| 2016/0327653 A1* | 11/2016 | Humphreys | G01S 19/54 |
| 2023/0360406 A1* | 11/2023 | Yu | G06T 7/73 |
| 2024/0069214 A1* | 2/2024 | Davidson | G01S 19/485 |

* cited by examiner

*Primary Examiner* — Hitesh Patel
*Assistant Examiner* — Luke Huynh
(74) *Attorney, Agent, or Firm* — Vivacqua Crane, PLLC

(57) ABSTRACT

A vehicle system is provided for correcting in real-time a camera-based estimated position of a road object. The system includes a camera for generating an image input signal including image sensor data associated with the road object. The system further includes one or more input devices for generating a vehicle input signal including vehicle sensor data associated with a position, a speed, and a heading of the vehicle. The system further includes a computer, which includes one or more processors and a non-transitory computer readable medium (CRM) storing instructions. The processor is programmed to match the image sensor data and the vehicle sensor data to one another based on a common time of collection. The processor is further programmed to determine an error model and a deviation of a current camera-based position from a predicted position. The processor is further programmed to update the error model based on the deviation.

20 Claims, 5 Drawing Sheets

SYSTEM AND METHOD FOR CORRECTING IN REAL-TIME AN ESTIMATED POSITION OF A ROAD OBJECT

INTRODUCTION

The present disclosure relates to vehicle systems and methods that use cameras to estimate locations of road objects, and more particularly to a vehicle system and method of using sensor fusion to correct in real-time positions of road objects that are estimated based on image sensor data from cameras.

Car manufacturers are continuously investigating advanced driving automation autonomous vehicles using High Definition maps (HD maps) for navigating the roads. Car manufacturers may obtain the HD maps from third party suppliers. These third party suppliers may utilize aerial Imagery, aerial LIDAR data, and multiple specialty vehicles equipped with one or more sensor arrays (e.g., including a Differential GPS (D-GPS, LIDAR sensors, etc.) to collect map and sensor data associated with road objects and traffic rules of the surrounding environment to create the HD maps.

The car manufacturers may receive finalized HD maps from the third party suppliers. However, the car manufacturers may not receive the raw map and sensor data and/or the algorithm used to generate the HD maps. As a result, the car manufacturer may be less efficient at or less capable of validating the HD maps, and the car manufacturer may instead discover errors in the HD maps only by relying on reports from vehicles in the field. Furthermore, as compared to the number of vehicles produced by the car manufacturers, the third party supplier may have significantly fewer specialty vehicles collecting the map and sensor data. As a result, the HD maps may not include the geographical areas where all of the vehicles are driven. Moreover, because certain areas may be densely populated with trees that may obscure aerial imagery, the HD maps may not include those geographical areas. In addition, the third party suppliers may deploy specialty vehicles on a predetermined schedule for updating the HD maps, such that the third party supplier may not deploy in real-time the specialty vehicles when deviations in road object locations first occur.

Thus, while existing systems achieve their intended purpose, there is a need for a new and improved system that addresses these issues.

SUMMARY

According to several aspects of the present disclosure, a vehicle system is provided for correcting in real-time a camera-based estimated position of a road object. The vehicle system includes a Global Navigation Satellite System (GNSS). The system further includes a camera, which is attached to the vehicle and collects image sensor data associated with the road object. The camera generates an image input signal including the image sensor data. The system further includes one or more input devices, which collects vehicle sensor data associated with a current vehicle position, a current vehicle speed, and a current vehicle heading. The input device generates a vehicle input signal including the vehicle sensor data. The system further includes a computer, which is attached to the vehicle and includes one or more processors electronically communicating with the camera and the input device. The computer further includes a non-transitory computer readable storage medium (CRM) storing instructions, such that the processor is programmed to receive the image input signal from the camera and the vehicle input signal from the input device. The processor is further programmed to match the image sensor data and the vehicle sensor data to one another based on a common time of collection by the associated camera and the associated input device. The processor is further programmed to determine an error model based on the image sensor data and the vehicle sensor data that are matched to one another. The processor is further programmed to determine a predicted position of the road object based on the error model, the current vehicle position, the current vehicle speed, and the current vehicle heading. The processor is further programmed to determine a current camera-based position of the road object based on the image sensor data. The processor is further programmed to determine a deviation of the current camera-based position from the predicted position. The processor is further programmed to update the error model based on the deviation by removing a plurality of outlier intersections and determining a mean to reduce an error in the current camera-based position, such that the GNSS is capable of correcting an error in the camera-based position of the road object.

In one aspect, the input devices include a LIDAR sensor for collecting ranging sensor data associated with an offset distance between the vehicle and the road object. The offset distance includes a longitudinal offset distance and a lateral offset distance. The LIDAR sensor generates an offset input signal including the ranging sensor data. The processor is further programmed to compare the offset distance to an offset threshold, in response to the processor receiving the offset input signal from the LIDAR sensor. The processor is further programmed to match the image sensor data and the vehicle sensor data to one another, in response to the processor determining that the offset distance is below the offset threshold.

In another aspect, the processor is further programmed to determine a linear regression model for a longitudinal direction of the vehicle to calculate a corrected longitudinal distance between the vehicle and the road object, based on the offset longitudinal distance, the current vehicle speed, and a current vehicle acceleration.

In another aspect, the processor is further programmed to determine the linear regression model for a lateral direction of the vehicle to calculate a corrected lateral distance between the vehicle and the road object, based on the offset lateral distance, the current vehicle speed, and the current vehicle acceleration.

In another aspect, the input devices include a vehicle speed sensor for collecting speed sensor data associated with a first speed of the vehicle measured at a first time and a second speed of the vehicle measured at a second time. The vehicle speed sensor generates a speed input signal including the speed sensor data. The processor is further programmed to compare the first speed of the vehicle to the second speed of the vehicle, in response to the processor receiving the speed input signal from the vehicle speed sensor. The processor is further programmed to match the image sensor data and the vehicle sensor data to one another, in response to the processor determining that a deviation between the first and second speeds is above a speed deviation threshold.

In another aspect, the input devices include a weather telematics module for collecting sensor data associated with a current weather condition, and the weather telematics module generates a weather input signal associated with the sensor data. The processor is further programmed to compare the current weather condition to a predetermined precipitation event, in response to the processor determining that the offset distance is not below the offset threshold and in further response to the processor determining that the deviation between the first and second speeds is not above the speed deviation threshold. The processor is further programmed to match the image sensor data and the vehicle sensor data to one another, in response to the processor determining that the weather condition is a precipitation event.

In another aspect, the GNSS transmits a vehicle signal to the processor. The vehicle signal includes vehicle sensor data that indicates the current vehicle position, the current vehicle speed, and the current vehicle heading, and the processor is further programmed to generate a unique object identification for the road object. The processor is further programmed to construct a data frame for the unique object identification to align the road object with the current vehicle position, the current vehicle speed, the current vehicle heading and a position of the road object relative to the vehicle at a plurality of associated time entries.

In another aspect, the processor is further programmed to initiate a timer for gauging an elapsed time, in response to the processor beginning to match the image sensor data and the vehicle sensor data to one another based on a common time of collection. The processor is further programmed to compare the elapsed time to a time threshold. The processor is further programmed to cluster predicted position data associated with the road object to predict an absolute location of the road object, in response to the processor determining that the elapsed time is below the time threshold.

In another aspect, the vehicle input sensor further includes an odometer for generating a distance input signal including distance sensor data indicating a mileage of the vehicle. The processor is further programmed to receive, from the odometer, the distance input signal including the distance sensor data that indicates the mileage of the vehicle. The processor is further programmed to determine a distance traveled by the vehicle, in response to the processor beginning to match the image sensor data and the vehicle sensor data to one another based on a common time of collection. The processor is further programmed to compare the distance traveled by the vehicle to a distance threshold. The processor is further programmed to cluster predicted position data associated with the road object, in response to the processor determining that the distance travelled by the vehicle is above the distance threshold.

In another aspect, the processor is further programmed to initiate a counter for counting a number of samples, in response to the processor beginning to match the image sensor data and the vehicle sensor data to one another based on a common time of collection. The processor is further programmed to compare the number of samples to a sample threshold. The processor is further programmed to cluster predicted position data associated with the road object to predict the absolute location of the road object, in response to the processor determining that the number of samples is not equal to the sample threshold.

In another aspect, the CRM further stores a look-up table, and the processor is further programmed to determine a plurality of regression coefficients for the error model based on the lookup table and the vehicle sensor data.

In another aspect, the input devices further include a remote server spaced from the vehicle and electronically communicating with the processor of the computer. The remote server stores ground truth data and the processor is further programmed to determine a plurality of regression coefficients for the error model based on the ground truth data received from the remote server and the image sensor data received from camera.

According to several aspects of the present disclosure, a computer is provided for a vehicle system that facilitates a Global Navigation Satellite System (GNSS) and corrects in real-time a camera-based estimated position of a road object. The vehicle system further includes a camera and one or more input devices. The computer includes one or more processors, which receives an image input signal from the camera. The image input signal is associated with image sensor data collected by the camera, and the image sensor data is associated with the road object. The processor receives a vehicle input signal from the input device. The vehicle input signal is associated with vehicle sensor data collected by the input device, and the vehicle sensor data is associated with a current vehicle position, a current vehicle speed, and a current vehicle heading. The computer further includes a non-transitory computer readable storage medium (CRM) storing instructions, such that the processor is programmed to receive the image input signal from the camera and the vehicle input signal from the input device. The processor is further programmed to match the image sensor data and the vehicle sensor data to one another based on a common time of collection by the associated camera and the associated input device. The processor is further programmed to determine an error model based on the image sensor data and the vehicle sensor data that are matched to one another. The processor is further programmed to determine a predicted position of the road object based on the error model, the current vehicle position, the current vehicle speed, and the current vehicle heading. The processor is further programmed to determine a current camera-based position of the road object based on the image sensor data. The processor is further programmed to determine a deviation of the current camera-based position from the predicted position. The processor is further programmed to update the error model based on the deviation by removing a plurality of outlier intersections and determining a mean to reduce an error in the current camera-based position, such that the GNSS is capable of correcting an error in an absolute position of the road object.

In one aspect, the processor is further programmed to compare an offset distance between the vehicle and the road object to an offset threshold, in response to the processor receiving an offset input signal from a LIDAR sensor. The processor is further programmed to match the image sensor data and the vehicle sensor data to one another, in response to the processor determining that the offset distance is below the offset threshold.

In another aspect, the processor is further programmed to determine a linear regression model for a longitudinal direction of the vehicle to calculate a corrected longitudinal distance between the vehicle and the road object, based on the offset distance, the current vehicle speed, and a current vehicle acceleration.

In another aspect, the processor is further programmed to determine the linear regression model for a lateral direction of the vehicle to calculate a corrected lateral distance between the vehicle and the road object, based on the offset distance, the current vehicle speed, and the current vehicle acceleration.

According to several aspects of the present disclosure, a method is provided for operating a computer for a system of a vehicle that facilitates a Global Navigation Satellite System (GNSS). The computer includes one or more processors and a non-transitory computer readable storage medium (CRM) storing instructions. The method includes receiving, using the processor, an image input signal from a camera, with the image input signal including image sensor data that is in turn associated with a road object. The method further includes receiving, using the processor, a vehicle input signal from one or more input device, with the vehicle input signal including vehicle sensor data that is associated with a current vehicle position, a current vehicle speed, and a current vehicle heading. The method further includes matching, using the processor, the image sensor data and the vehicle sensor data to one another based on a common time of collection by the associated camera and the associated input device. The method further includes determining, using the processor, a error model based on the image sensor data and the vehicle sensor data that are matched to one another. The method further includes determining, using the processor, a predicted position of the road object based on the error model, the current vehicle position, the current vehicle speed, and the current vehicle heading. The method further includes determining, using the processor, a current camera-based position of the road object based on the image sensor data. The method further includes determining, using the processor, a deviation of the current camera-based position from the predicted position. The method further includes updating, using the processor, the error model based on the deviation by removing a plurality of outlier intersections and determining a mean, such that the GNSS is capable of correcting an absolute position of the road object.

In one aspect, the method further includes comparing, using the processor, an offset distance between the vehicle and the road object to an offset threshold in response to the processor receiving an offset input signal from a LIDAR sensor. The method further includes matching, using the processor, the image sensor data and the vehicle sensor data to one another in response to the processor determining that the offset distance is below the offset threshold.

In another aspect, the method further includes determining, using the processor, a linear regression model for a longitudinal direction of the vehicle to calculate a corrected longitudinal distance between the vehicle and the road object, based on the offset distance, the current vehicle speed, and a current vehicle acceleration.

In another aspect, the method further includes determining, using the processor, the linear regression model for a lateral direction of the vehicle to calculate a corrected lateral distance between the vehicle and the road object, based on the offset distance, the current vehicle speed, and the current vehicle acceleration.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
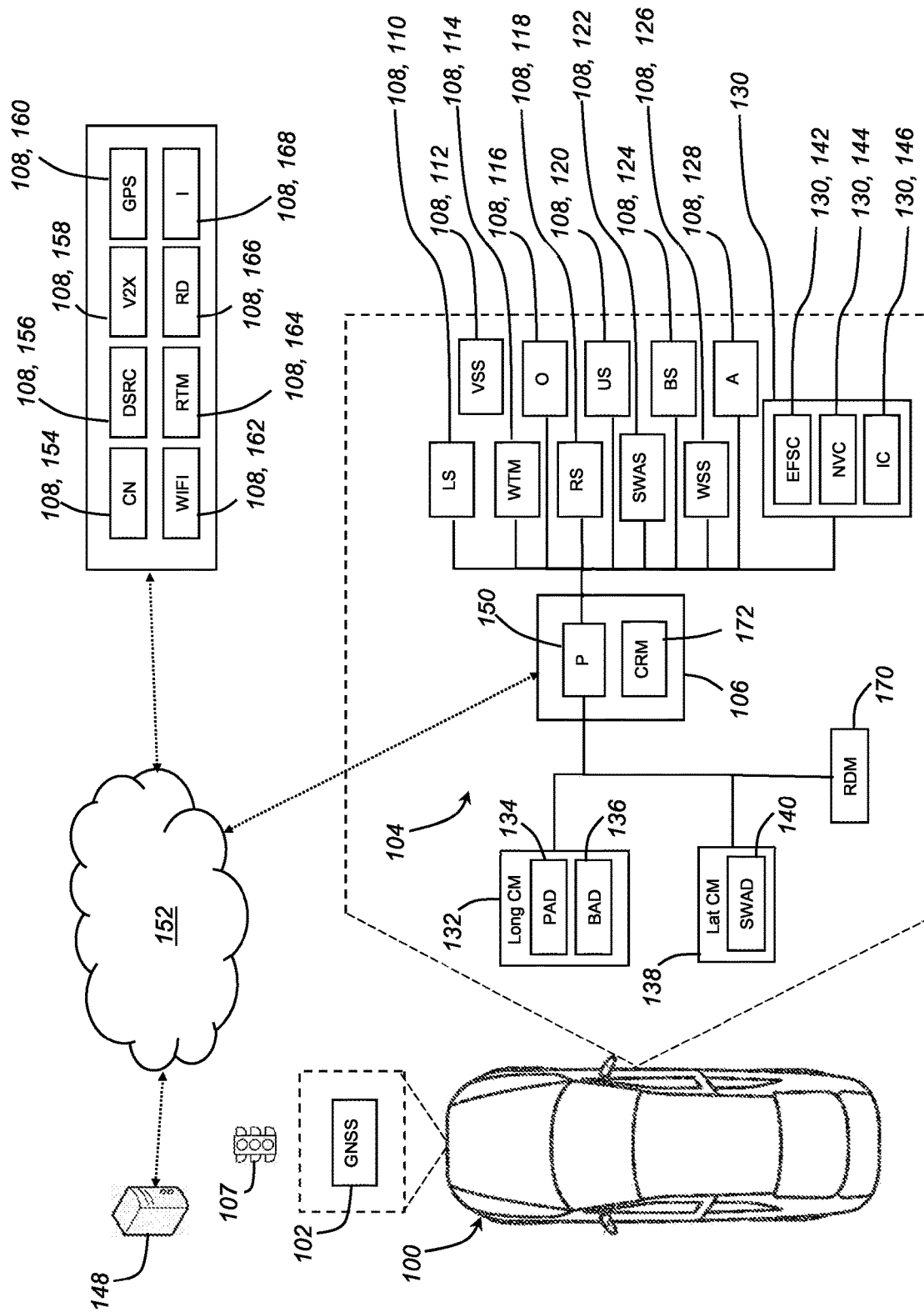
FIG. 1 is a schematic view of one non-limiting example of a vehicle having a vehicle system having a computer for correcting in real-time a camera-based estimated position of a road object.

The following description is merely exemplary in nature and is not intended to limit the present disclosure, application, or uses.

The present disclosure describes one example of a vehicle 100 (FIG. 1) having a Global Navigation Satellite System (GNSS) 102 and a vehicle system 104 that may facilitate the GNSS 102. The vehicle system 104 includes a computer 106, which uses sensor fusion to decrease, in real-time, errors in determining camera-based positions of road objects 107. Non-limiting examples of the vehicle 100 (e.g., a sedan, a light duty truck, a heavy duty truck, a sport utility vehicle, a van, a motor home, a passenger bus, a commercial truck, a waste collection vehicle, a utility vehicle, a delivery vehicle, an emergency vehicle, etc.) may include an autonomous vehicle, an semi-autonomous vehicle, or a non-autonomous (manual) vehicle with an associated propulsion system (e.g., an internal combustion engine and/or an electric motor, hydrogen fuel cells, etc.).

In some non-limiting examples as described in detail below, the vehicle system 104 constructs and updates an error model based on sensor data merged from one or more input devices 108 (e.g., a LIDAR sensor 110, a vehicle speed sensor 112, a weather telematics module 114, an odometer 116, a RADAR sensor 118, an ultrasonic sensor 120, a steering wheel angle sensor 122, a brake sensor 124, a wheel speed sensor 126, and/or an accelerometer 128, among other examples) to correct, in real-time, errors in estimated locations of road objects (e.g., locations of traffic signs, traffic signals, etc.) that are based on image sensor data from a camera 130. As a result, the vehicle system 104 may provide autonomous vehicle maps with coverage that is more accurate than vehicle maps provided by third party suppliers. Furthermore, the vehicle system 104 may provide autonomous vehicle maps that cover geographic areas associated with aerial views that may be obstructed by trees, buildings, bridges, and the like. In addition, the vehicle system 104 may be integrated within one or more fleets of OEM vehicles for updating in real-time autonomous vehicle maps within shorter cycle times as compared to the maps provided by third party suppliers that may less often deploy specialty vehicles, which are fewer in number than the fleet OEM vehicles. In other non-limiting examples, it is contemplated that the vehicle system can be integrated in specialty vehicles used by third party suppliers for the OEM.

Referring to FIG. 1, one non-limiting example of the vehicle 100 is the autonomous vehicle, which includes a longitudinal control submodule 132 for controlling a propulsion actuation device 134 and/or a braking actuation device 136. The vehicle 100 may further include a lateral control submodule 138 for controlling a steering actuation device 140 of the vehicle 100. In other non-limiting examples, the vehicle is a semi-autonomous vehicle or a non-autonomous vehicle with an accelerator, a brake, and a steering wheel that are manually operated by a driver.

The vehicle system 104 includes the camera 130, which is attached to the vehicle 100 for collecting image sensor data associated with the road object 107 (e.g., a traffic light, a traffic signal, a railroad crossing, a roundabout, an embankment, other road geometry, a road barrier, a construction barrel, a construction cone, another vehicle, a Vulnerable Road User (VRU, such as a pedestrian; a roadway worker; a person operating a wheelchair or other personal mobility device, whether motorized or not; a person operating an electric scooter or similar; and a person operating a bicycle or other nonmotorized means of transportation), and the like). The camera 130 is configured to generate an image input signal including the image sensor data. Non-limiting examples of the camera 130 include an externally-facing stereo camera 142, a night-vision camera 144, an infrared camera 146, and/or the like. However, the vehicle system can have other suitable cameras.

The vehicle system 104 further includes one or more input devices 108 configured to collect vehicle sensor data associated with at least a current vehicle position, a current vehicle speed, and a current vehicle heading. The input device 108 is configured to generate a vehicle input signal including the vehicle sensor data. In this non-limiting example, the input devices 108 may include the GNSS 102 configured to collect vehicle sensor data that indicates the current vehicle position, the current vehicle speed, and the current vehicle heading, and the GNSS 102 may be further configured to generate a vehicle input signal associated with the vehicle sensor data. More specifically, the input device 108 may include a vehicle speed sensor 112 configured to collect speed sensor data associated with a current vehicle speed, and the vehicle speed sensor 112 may be further configured to generate a vehicle input signal including the vehicle sensor data. In this non-limiting example, the vehicle speed sensor 112 may be configured to collect speed sensor data associated with a first speed of the vehicle measured at a first time and a second speed of the vehicle measured at a second time, and the vehicle speed sensor 112 may be configured to generate a speed input signal including the speed sensor data. The input device 108 may further include the LIDAR sensor 110 configured to collect ranging sensor data associated with an offset distance between the vehicle and the road object, with the offset distance including a longitudinal offset distance and a lateral offset distance. The LIDAR sensor 110 may be further configured to generate an offset input signal including the ranging sensor data. The input device 108 may further include a weather telematics module 114 collecting weather sensor data associated with a current weather condition, and the weather telematics module 114 may be configured to generate a weather input signal associated with the weather sensor data. The input device 108 may further include an odometer 116 configured to generate a distance input signal including the distance sensor data that indicates the mileage of the vehicle. The input device 108 may further include a remote server 148 spaced from the vehicle 100 and electronically communicating with a processor 150 of a computer as described below, with the remote server storing ground truth data associated with positions of the road objects.

Non-limiting examples of the input device 108 may further include off-board devices in the data and communication network 152 (e.g., a cellular network 154, a Dedicated Short-Range Communications (DSRC) network 156, a Vehicle-To-Infrastructure (V2X) network 158, a Global Positioning Satellite (GPS) network 160, a Wi-Fi network 162, a road traffic monitoring network 164, a road database 166, an Internet network 168, among other examples). However, it is contemplated that the input device may include other suitable driver monitoring devices, on-board devices, or off-board devices. It is contemplated that the system may include other suitable sensors that collect various data (e.g., vehicle pitch, yaw rate, etc.) for predicting or correcting camera-based positions of the road objects.

The input devices 108 may further include a road detection module 170 for generating a road signal. In this non-limiting example, the road detection module 170 may include the LIDAR sensor 110, the RADAR sensor 118, the externally-facing stereo camera 142, the night-vision camera 144, the infrared camera 146, the ultrasonic sensor 120, the cellular network 154, the DSRC network 156, the V2X network 158, the GPS network 160, the Wi-Fi network 162, the road traffic monitoring network 164, the road database 166, and/or the Internet network 168 among other examples.

The vehicle system 104 further includes a computer 106 attached to the vehicle 100 and having one or more processors 150. The processor 150 electronically communicates with the camera 130 for receiving the image input signal from the camera 130, and the processor 150 electronically communicates with the camera 130 for receiving the vehicle input signal from the input device 108.

The computer 106 further includes a non-transitory computer readable storage medium 172 (CRM) storing a look-up table. The CRM 172 further stores instructions such that the processor is programmed to receive the image input signal from the camera 130 and the vehicle input signal from the input device 108.

The processor 150 is further programmed to filter the sensor data and match the image sensor data and the vehicle sensor data to one another based on a common time of collection by the associated camera 130 and the associated input device 108. More specifically, the processor 150 is programmed to compare the offset distance to an offset threshold, in response to the processor 150 receiving the offset input signal from the LIDAR sensor 110. The offset threshold is a distance between the vehicle and the road object where the accuracy of the camera-based estimated positions may change. The processor 150 is further programmed to match the image sensor data and the vehicle sensor data to one another, in response to the processor determining that the offset distance is below the offset threshold. The processor 150 is further programmed to compare the first speed of the vehicle 100 to the second speed of the vehicle, in response to the processor 150 receiving the speed input signal from the vehicle speed sensor 112. The processor 150 is programmed to match the image sensor data and the vehicle sensor data to one another, in response to the processor determining that a deviation between the first and second speeds is above a speed deviation threshold (e.g., speed deviation threshold associated with brakes being applied to stop the vehicle at the traffic light or the traffic sign, etc.). The processor 150 is programmed to compare the current weather condition to a predetermined precipitation event, in response to the processor 150 determining that the offset distance is not below the offset threshold and in further response to the processor 150 determining that the deviation between the first and second speeds is not above the speed deviation threshold. The processor 150 is further programmed to match the image sensor data and the vehicle sensor data to one another, in response to the processor 150 determining that the weather condition is a precipitation event.

The processor 150 is programmed to generate a unique object identification for the associated road object. The processor 150 is programmed to construct a data frame for the unique object identification to align the road object 107 with the current vehicle position, the current vehicle speed, the current vehicle heading, and a position of the road object relative to the vehicle 100 at a plurality of associated time entries.

The processor 150 is programmed to determine an error model based on the image sensor data and the vehicle sensor data that are matched to one another. More specifically, in this non-limiting example, the processor 150 is further programmed to determine a linear regression model for a longitudinal direction of the vehicle to calculate a corrected longitudinal distance between the vehicle and the road object 107, based on the offset longitudinal distance, the current vehicle speed, and a current vehicle acceleration, according to Equation 1:

$$Y = a + bx_1 + cx_2 + dx_3 \qquad \text{Eqn. 1}$$

where Y represents a corrected longitudinal distance; a, b, c, and d are constants; and regressors include a longitudinal distance ($x_1$), a vehicle speed ($x_2$), and a vehicle acceleration ($x_3$).

Also, in this non-limiting example, the processor 150 is further programmed to determine the linear regression model for a lateral direction of the vehicle to calculate a corrected lateral distance between the vehicle 100 and the road object 107, based on the offset lateral distance, the current vehicle speed, and the current vehicle acceleration, according to Equation 2:

$$X = p + qx_1 + rx_2 + sx_3 \qquad \text{Eqn. 2}$$

where X represents a corrected lateral distance; p, q, r, and s are constants; and regressors include a lateral distance ($x_1$), the vehicle speed ($x_2$), and the vehicle acceleration ($x_3$). Other non-limiting examples of the processor can use any suitable error model (e.g., linear regression model, non-linear regression model, and the like).

The processor 150 is further programmed to determine a plurality of regression coefficients for the error model based on the lookup table and the vehicle sensor data. The processor 150 is further programmed to determine a plurality of regression coefficients for the error model based on the ground truth data received from the remote server 148 and the image sensor data received from camera 130.

The processor 150 is further programmed to determine a predicted position of the road object 107 based on the error model, the current vehicle position, the current vehicle speed, and the current vehicle heading. The processor 150 is further programmed to determine a current camera-based position of the road object based on the image sensor data. The processor 150 is further programmed to determine a deviation of the current camera-based position from the predicted position. The processor 150 is further programmed to buffer/store the collected the image sensor data and the vehicle sensor data.

The processor 150 is further programmed to cluster predicted position data associated with the road object to predict an absolute location of the road object when one or more predetermined conditions are satisfied. More specifically, the processor 150 is programmed to initiate a timer for gauging an elapsed time, in response to the processor 150 filtering the vehicle sensor data and image sensor data. The processor 150 is further programmed to compare the elapsed time to a time threshold and cluster the predicted position data, in response to the processor determining that the elapsed time is below the time threshold. The processor 150 is further programmed to receive, from the odometer 116, the distance input signal including the distance sensor data that indicates the mileage of the vehicle. The processor 150 is further programmed to determine a distance traveled by the vehicle 100, in response to the processor 150 filtering the vehicle sensor data and image sensor data. The processor 150 is further programmed to compare the distance traveled by the vehicle 100 to a distance threshold and cluster the predicted position data, in response to the processor 150 determining that the distance travelled by the vehicle 100 is above the distance threshold. The processor 150 is further programmed to initiate a counter for counting a number of samples, in response to the processor 150 filtering the vehicle sensor data and image sensor data. The processor 150 is further programmed to compare the number of samples to a sample threshold and cluster the predicted position data, in response to the processor 150 determining that the number of samples is equal to the sample threshold.

The processor 150 is further programmed to update the error model based on the deviation by removing a plurality of outlier intersections and determining a mean to reduce an error in the current camera-based position, such that the GNSS 102 is capable of correcting an error in the camera-based position of the road object.

Figure 2:
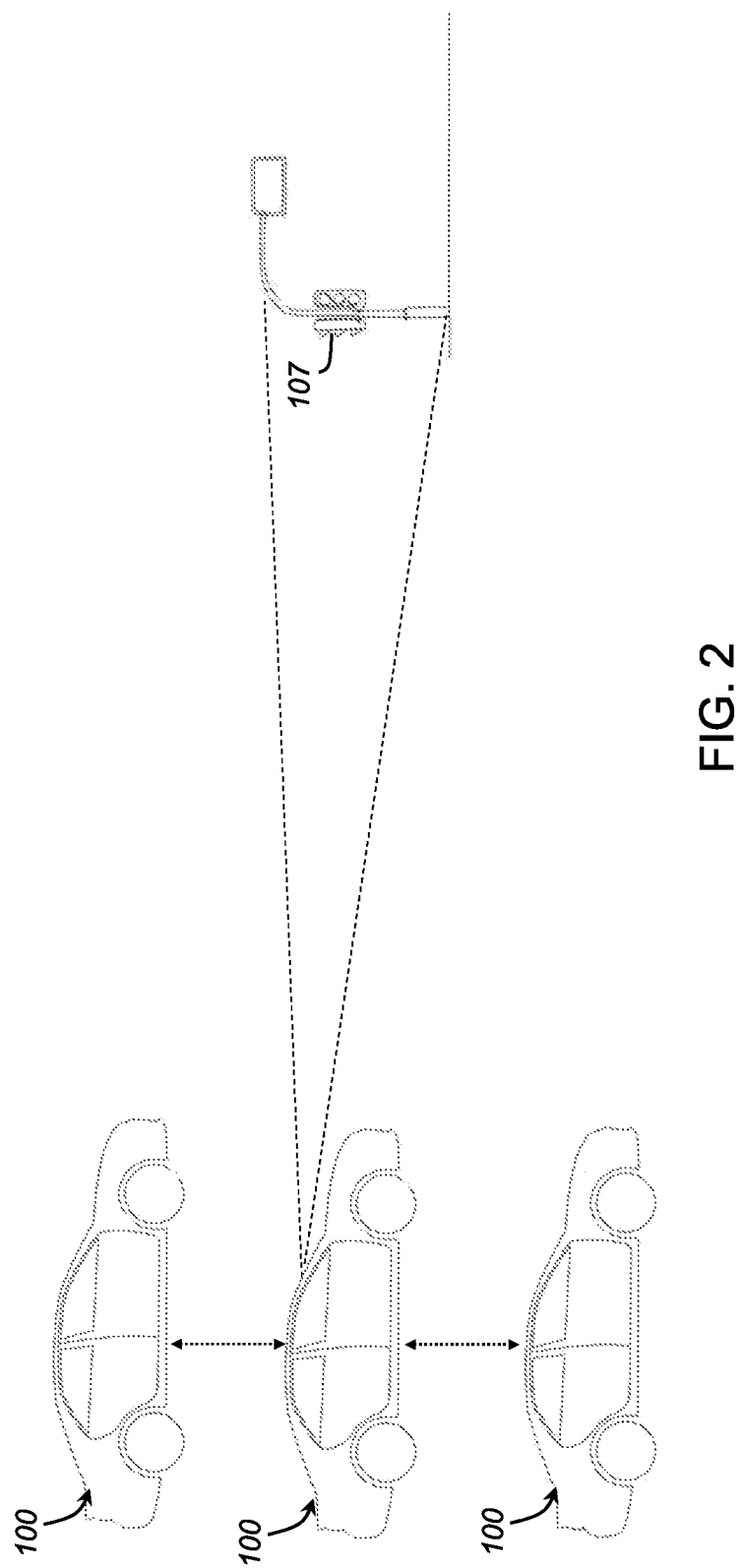
FIG. 2 is a schematic view of a plurality of the vehicles of FIG. 1, illustrating the vehicles wirelessly communicating with one another and determining a corrected position of a road object by using look-up table with regression coefficients based on vehicle sensor data.

Referring to FIG. 2, a plurality of the vehicles 100 of FIG. 1 may be connected vehicles wirelessly communicating with one another by the V2V network. These vehicles 100 may further determine the corrected position of the road object 107 by using the look-up table stored within the associated CRM of the vehicles 100 and the regression coefficients can be identified in the look-up table based on the vehicle sensor data collected by the computers of the associated vehicles 100.

Figure 3:
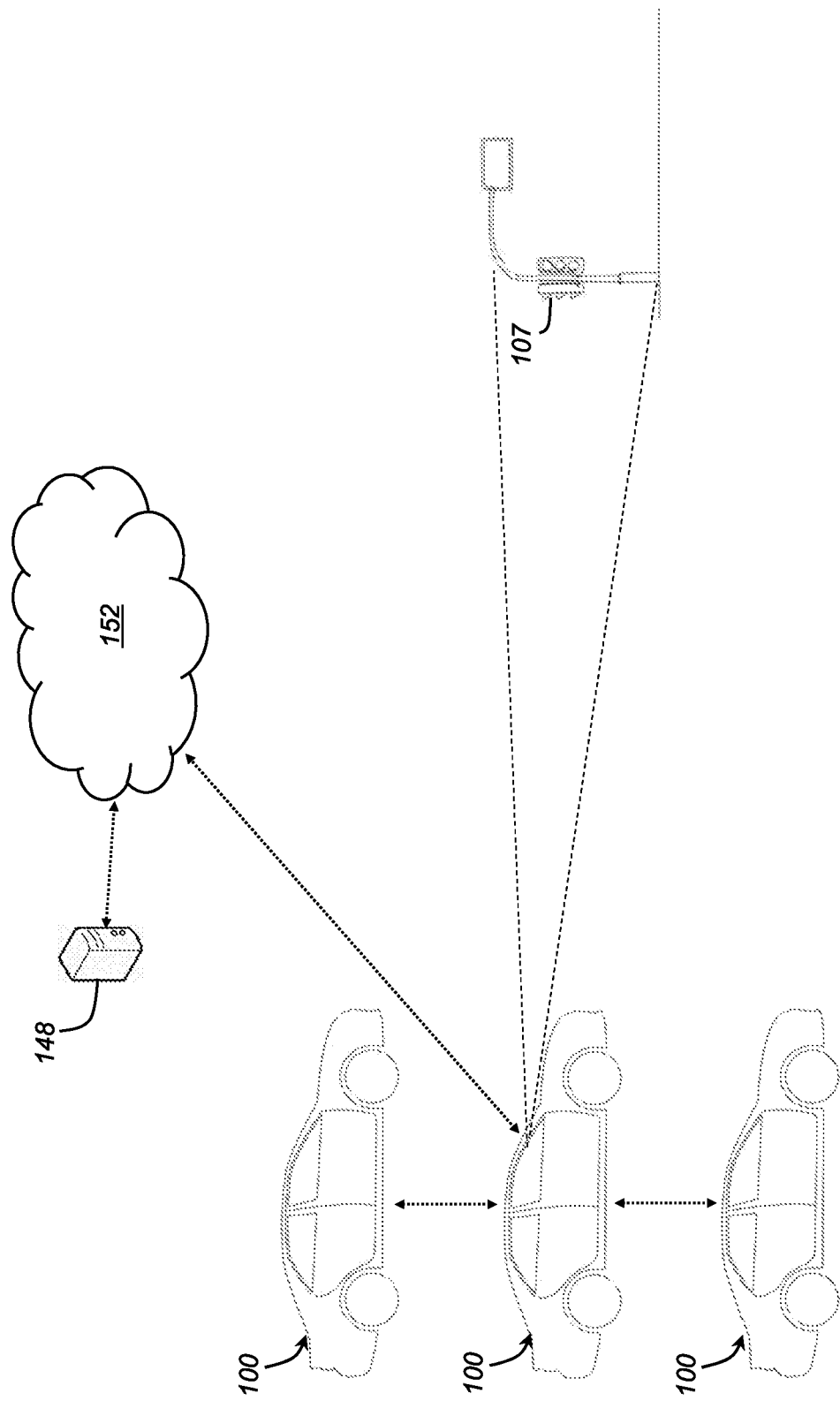
FIG. 3 is a schematic view of a plurality of the vehicles of FIG. 1, illustrating the vehicles receiving ground truth data from a cloud-based remote server and determining a corrected position of a road object based by generating regression coefficients based on the ground truth data and camera-based estimated positions of the road object.

Referring to FIG. 3, the vehicles 100 of FIG. 1 may be further wirelessly communicating with the cloud-based remote server 148 via the data and communication network 152. The vehicles may receive ground truth data from the cloud-based remote server 148, such that the processor may determine the corrected position of the road object 107 by generating regression coefficients based on the ground truth data and camera-based estimated positions of the road object.

Figure 4:
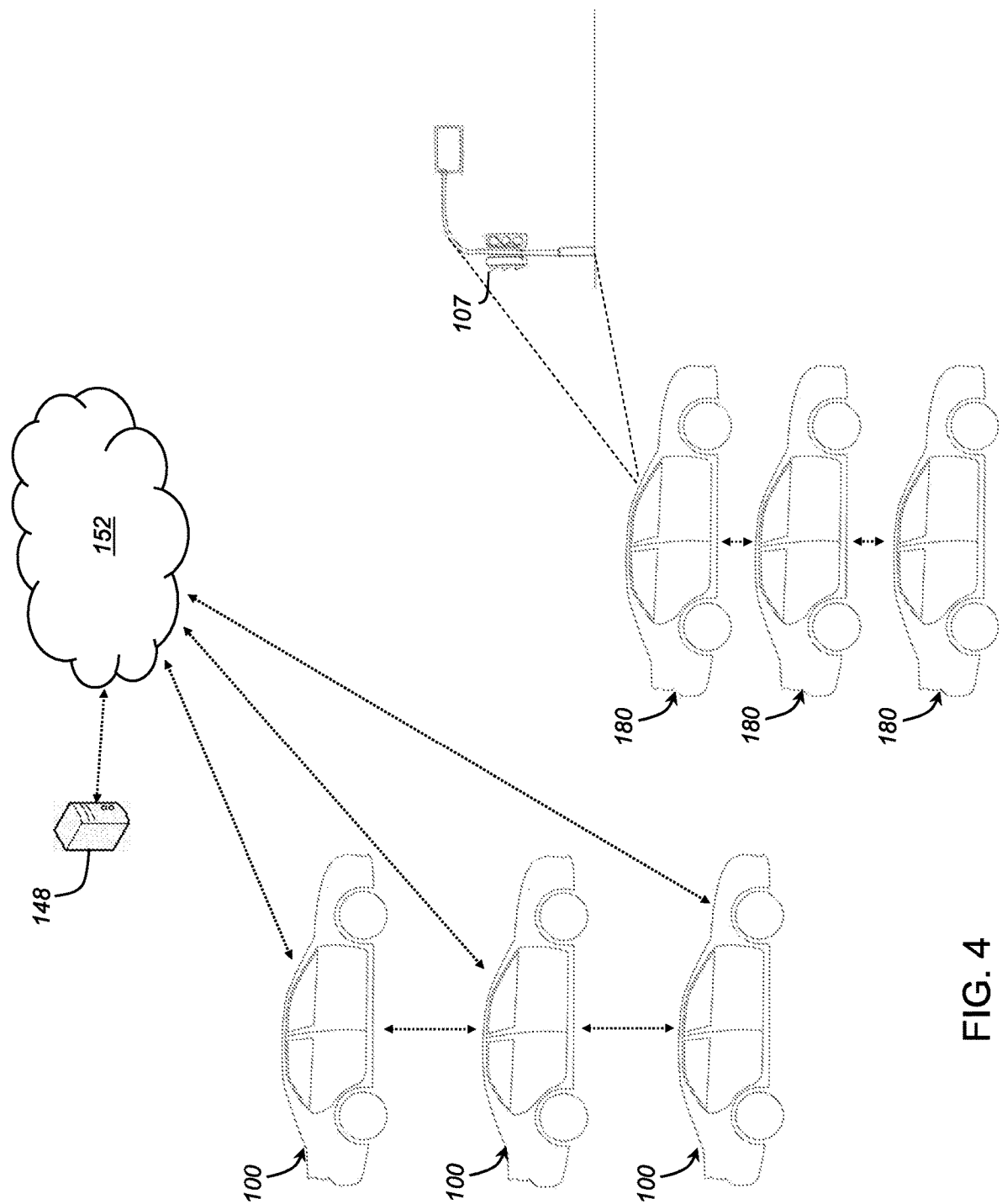
FIG. 4 is a schematic view of a plurality of the vehicles of FIG. 1, illustrating the vehicles being facilitated by a plurality of probe vehicles that send camera observations to a cloud-based remote server that uses the camera observations and ground truth data to generate regression coefficients used by the vehicles for determining a corrected position of the road object.

Referring to FIG. 4, the vehicles 100 of FIG. 1 may be further wirelessly communicating with a plurality of probe vehicles 180 using associated cameras (not shown) to image sensor data associated with the road object and transmitted to the remote server 148. The remote server 148 may use the image sensor data and ground truth data to generate regression coefficients. The vehicles 100 may receive regression coefficients from the remote server 148 for determining the corrected position of the road object 107 when those vehicles 100 are located in the geographical area of the road object 107.

Figure 5:
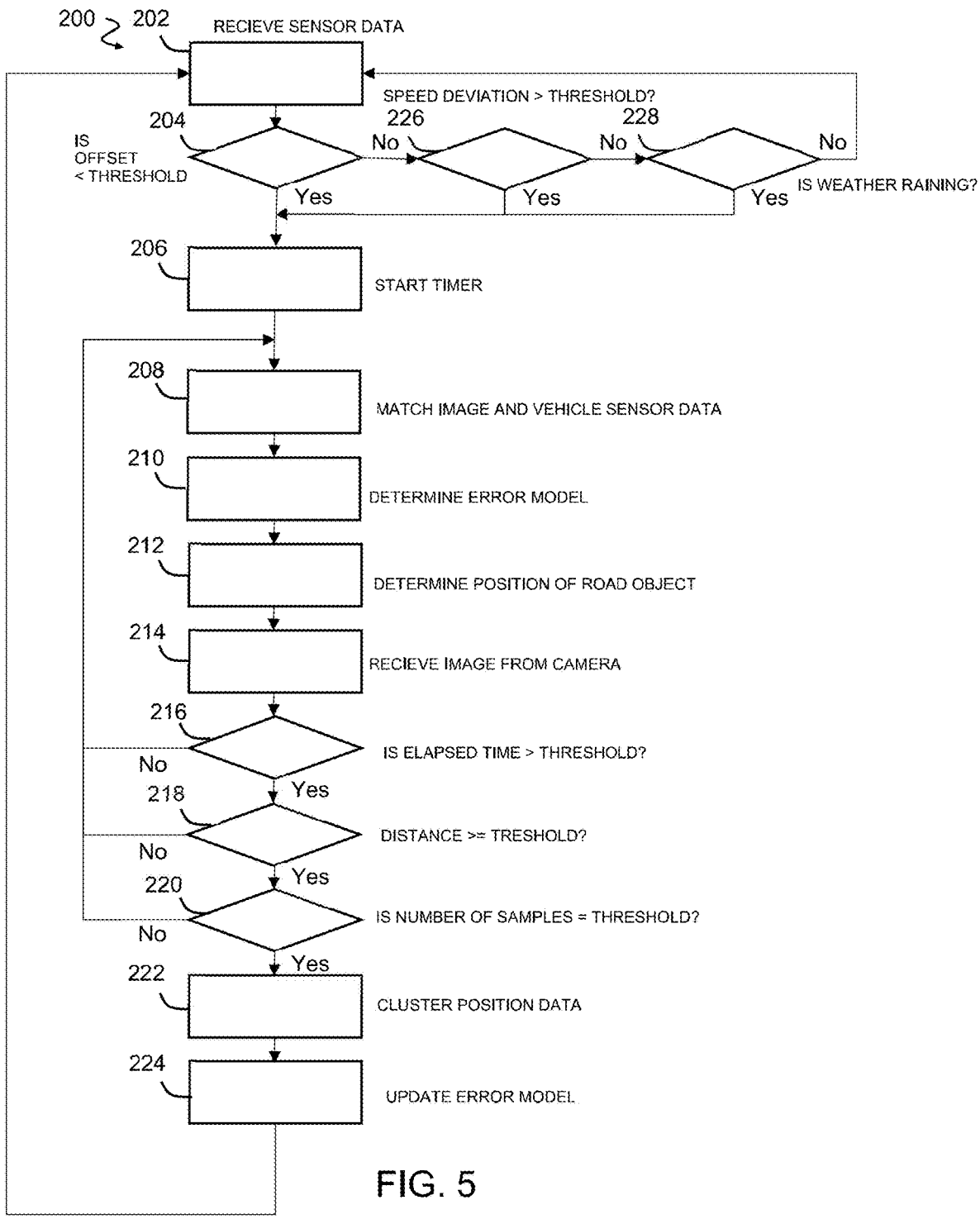
FIG. 5 is a flow chart of one example of a method of operating the computer for the system of FIG. 1.

Referring to FIG. 5, one non-limiting example of a method 200 is provided for operating the computer 106 for the vehicle system 104 of FIG. 1. The method 200 begins at block 202 with receiving, using the processor 150, the image sensor data and the vehicle sensor data, such that the computer 106 filters filtering the image sensor data and the vehicle sensor data to detect and correct errors in locations where there is a higher probability of those errors. More specifically, in this non-limiting example, the method 200 includes receiving, using the processor 150, the vehicle input signal from the associated input devices 108, with the vehicle input signal including the vehicle sensor data. The sensor data is associated with the current vehicle position, the current vehicle speed, the current vehicle heading, the first speed of the vehicle measured at the first time, the second speed of the vehicle measured at the second time, the offset distance between the vehicle 100 and the road object 107, the current weather condition, and the mileage of the vehicle 100. It is contemplated that the sensor data may be associated with other suitable vehicle and/or road parameters. The method 200 then proceeds to block 204.

At block 204, the method 200 includes comparing, using the processor 150, the offset distance between the vehicle 100 and the road object 107 to the offset threshold, in response to the processor 150 receiving the offset input signal from the LIDAR sensor 110. If the processor 150 determines that the offset distance is below the offset threshold, the method proceeds to block 206. If the processor 150 determines that the offset distance is not below the offset threshold, the method proceeds to block 226.

At block 206, the method 200 further includes initiating, using the processor 150, the timer for gauging the elapsed time, in response to the processor 150 filtering the vehicle sensor data and the image sensor data. The method 200 further includes the processor 150 receiving, from the odometer 116, the distance input signal including the distance sensor data that indicates the mileage of the vehicle, in response to the processor 150 filtering the vehicle sensor data and the image sensor data. The method 200 further includes initiating, using the processor 150, the counter for counting the number of samples, in response to the processor 150 filtering the vehicle sensor data and the image sensor data. The method 200 then proceeds to block 208.

At block 208, the method 200 further includes matching, using the processor 150, the image sensor data and the vehicle sensor data to one another based on a common time of collection by the associated camera 130 and the associated input devices 108. More specifically, in this non-limiting example, the method 200 includes matching, using the processor 150, the image sensor data and the vehicle sensor data to one another in response to the processor 150 determining that the offset distance is below the offset threshold. The method 200 then proceeds to block 210.

At block 210, the method 200 further includes determining (e.g., constructing, updating, maintaining, etc.), using the processor 150, the error model based on the image sensor data and the vehicle sensor data that are matched to one another. The method 200 further includes determining, using the processor 150, the linear regression model for the longitudinal direction of the vehicle to calculate a corrected longitudinal distance between the vehicle 100 and the road object 107, based on the offset distance, the current vehicle speed, and a current vehicle acceleration. The method 200 further includes determining, using the processor 150, the linear regression model for the lateral direction of the vehicle 100 to calculate a corrected lateral distance between the vehicle 100 and the road object 107, based on the offset distance, the current vehicle speed, and the current vehicle acceleration. The method 200 then proceeds to block 212.

At block 212, the method 200 further includes determining, using the processor 150, the predicted position of the road object based on the error model, the current vehicle position, the current vehicle speed, and the current vehicle heading. The method 200 then proceeds to block 214.

At block 214, the method 200 further includes receiving, using the processor 150, the image input signal from the camera 130, with the image input signal including the image sensor data that is associated with the road object 107. The method 200 further includes determining, using the processor 150, the current camera-based position of the road object 107 based on the image sensor data. The method 200 further includes determining, using the processor 150, the deviation of the current camera-based position from the predicted position. The method then proceeds to block 216.

At block 216, the method 200 further includes determining, using the processor 150, whether a predetermined number of conditions have been satisfied in order to begin clustering predicted position data. More specifically, the method 200 includes determining, using the processor 150, the elapsed time and comparing the elapsed time to the time threshold. If the processor 150 determines that the elapsed time is not below the time threshold, the method 200 proceeds to block 218. If processor 150 determine that the elapsed time is below the time threshold, the method 200 returns to block 208.

At block 218, the method 200 further includes determining, using the processor 150, the distance traveled by the vehicle 100 after the processor 150 began matching the image sensor data and the vehicle sensor data to one another. The method 200 further includes comparing, using the processor 150, the distance traveled by the vehicle 100 to the distance threshold. If the processor 150 determines that the distance traveled by the vehicle 100 is equal to or above the distance threshold, the method 200 proceeds to block 220. If the processor 150 determines that the distance traveled by the vehicle 100 is not equal to or above the distance threshold, the method 200 returns to block 208.

At block 220, the method 200 further includes comparing, using the processor 150, the number of samples to the sample threshold. If the processor 150 determines that the number of samples is equal to the sample threshold, the method 200 proceeds to block 222. If the processor 150 determines that the number of samples is not equal to the sample threshold, the method 200 returns to block 208.

At block 222, the method 200 includes clustering, using the processor 150, predicted position data associated with the road object to predict the absolute location of the road object, in response to the processor 150 determining that: the elapsed time is not below the time threshold, the distance travelled by the vehicle 100 is equal to or above the distance threshold, and the number of samples is equal to the sample threshold. The method 200 then proceeds to block 224.

At block 224, the method 200 includes updating, using the processor 150, the error model based on the deviation by removing the outlier intersections and determining the mean. The method 200 further includes correcting, using the GNSS 102, the error in the absolute position of the road object 107. The method 200 returns to block 202.

At block 226, the method 200 further includes comparing, using the processor 150, the first speed of the vehicle 100 to the second speed of the vehicle, in response to the processor 150 receiving the speed input signal from the vehicle speed sensor 112. If the processor 150 determines that the deviation between the first and second speeds is above the speed deviation threshold, the method proceeds to block 206. If the processor 150 determines that the deviation between the first and second speeds is not above the speed deviation threshold, the method then proceeds to block 228.

At block 228, the method 200 further includes comparing, using the processor 150, the current weather condition to a predetermined precipitation event (e.g., rain, snow, sleet, hail, freezing temperatures, etc.), in response to the processor 150 determining that the offset distance between the vehicle 100 and the road object 107 is not below the offset threshold and in further response to the processor 150 determining that the deviation between the first and second speeds is not equal to or above the speed deviation threshold. If the processor 150 determines that the current weather condition is a predetermined precipitation event, the method proceeds to block 206. If the processor 150 determines that the current weather condition is not a predetermined precipitation event, the method 200 returns to block 202.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor may be communicatively coupled to, e.g., via the vehicle communications module, more than one local processor, e.g., included in electronic processor units (ECUs) or the like included in the vehicle 100 for monitoring and/or controlling various vehicle components. The processor 150 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 150 may transmit messages to various devices in the vehicle 100 and/or receive messages from the various devices, e.g., vehicle sensors, actuators, vehicle components, a Human Machine Interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle system in an autonomously controlled vehicle for correcting in real-time a camera-based estimated position of a road object and facilitating a Global Navigation Satellite System (GNSS), the vehicle system comprising:
    a camera attached to the vehicle and collecting image sensor data associated with the road object, and the camera generating an image input signal including the image sensor data;
    at least one input device for collecting vehicle sensor data associated with a current vehicle position, a current vehicle speed, and a current vehicle heading, and the at least one input device generating a vehicle input signal; and
    a computer attached to the vehicle and comprising at least one processor electronically communicating with the camera and the at least one input device, and the computer further comprises a non-transitory computer readable storage medium storing instructions such that the at least one processor is programmed to:
        receive the image input signal from the camera and the vehicle input signal from the at least one input device;
        match the image sensor data and the vehicle sensor data to one another based on a common time of collection by the associated camera and the associated at least one input device;
        determine an error model based on the image sensor data and the vehicle sensor data that are matched to one another;
        determine a predicted position of the road object based on the error model, the current vehicle position, the current vehicle speed, and the current vehicle heading;
        determine a current camera-based position of the road object based on the image sensor data;
        determine a deviation of the current camera-based position from the predicted position;
        update the error model based on the deviation by removing a plurality of outlier intersections and determining a mean to reduce an error in the current camera-based position, such that the GNSS is capable of correcting an error in the camera-based estimated position of the road object; and
        control the vehicle autonomously based on the updated error model.

2. The vehicle system of claim 1 wherein the at least one input device includes a LIDAR sensor for collecting sensor data associated with an offset distance between the vehicle and the road object, with the offset distance comprising a longitudinal offset distance and a lateral offset distance, the LIDAR sensor generating an offset input signal including ranging sensor data, and the at least one processor is further programmed to:
    compare the offset distance to an offset threshold in response to the at least one processor receiving the offset input signal from the LIDAR sensor; and
    match the image sensor data and the vehicle sensor data to one another in response to the at least one processor determining that the offset distance is below the offset threshold.

3. The vehicle system of claim 2 wherein the at least one processor is further programmed to determine a linear regression model for a longitudinal direction of the vehicle to calculate a corrected longitudinal distance between the vehicle and the road object, based on the offset longitudinal distance, the current vehicle speed, and a current vehicle acceleration.

4. The vehicle system of claim 3 wherein the at least one processor is further programmed to determine the linear regression model for a lateral direction of the vehicle to calculate a corrected lateral distance between the vehicle and the road object, based on the offset lateral distance, the current vehicle speed, and the current vehicle acceleration.

5. The vehicle system of claim 2 wherein the at least one input device includes a vehicle speed sensor for collecting sensor data associated with a first speed of the vehicle measured at a first time and a second speed of the vehicle measured at a second time, the vehicle speed sensor generating a speed input signal including the speed sensor data, and the at least one processor is further programmed to:
    compare the first speed of the vehicle to the second speed of the vehicle in response to the at least one processor receiving the speed input signal from the vehicle speed sensor; and
    match the image sensor data and the vehicle sensor data to one another in response to the at least one processor determining that a deviation between the first and second speeds are above a speed deviation threshold.

6. The vehicle system of claim 5 wherein the at least one input device includes a weather telematics module for collecting sensor data associated with a current weather condition, the weather telematics module generating a weather input signal associated with the sensor data, and the at least one processor is further programmed to:
    compare the current weather condition to a predetermined precipitation event in response to the at least one processor determining that the offset distance is not below the offset threshold and in further response to the at least one processor determining that the deviation between the first and second speeds are not above the speed deviation threshold; and
    match the image sensor data and the vehicle sensor data to one another in response to the at least one processor determining that the weather condition comprises a precipitation event.

7. The vehicle system of claim 1 wherein the GNSS transmits a vehicle signal to the at least one processor, with the vehicle signal being associated with the vehicle sensor data that indicates the current vehicle position, the current vehicle speed, and the current vehicle heading, and the at least one processor is further programmed to:
    generate a unique object identification for the road object; and
    construct a data frame for the unique object identification to align the road object with the current vehicle position, the current vehicle speed, the current vehicle heading and a position of the road object relative to the vehicle at a plurality of associated time entries.

8. The vehicle system of claim 1 wherein the at least one processor is further programmed to:
   initiate a timer for gauging an elapsed time;
   compare the elapsed time to a time threshold; and
   cluster predicted position data associated with the road object to predict an absolute location of the road object in response to the at least one processor determining that the elapsed time is below the time threshold.

9. The vehicle system of claim 8 wherein the at least one vehicle input sensor further comprises an odometer for generating a distance input signal including distance sensor data indicating a mileage of the vehicle, and the at least one processor is further programmed to:
   receive from the odometer the distance input signal including the distance sensor data indicating the mileage of the vehicle;
   determine a distance traveled by the vehicle after the at least one processor began matching the image sensor data and the vehicle sensor data to one another;
   compare the distance traveled by the vehicle to a distance threshold; and
   cluster predicted position data associated with the road object to predict the absolute location of the road object in response to the at least one processor determining that the distance travelled by the vehicle is above the distance threshold.

10. The vehicle system of claim 9 wherein the at least one processor is further programmed to:
    initiate a counter for counting a number of samples;
    compare the number of samples to a sample threshold; and
    cluster predicted position data associated with the road object to predict the absolute location of the road object in response to the at least one processor determining that the number of samples is below the sample threshold.

11. The vehicle system of claim 1 wherein the computer readable storage medium further stores a look-up table, and the at least one processor is further programmed to determine a plurality of regression coefficients for the error model based on a lookup table and the vehicle sensor data.

12. The vehicle system of claim 1 wherein the at least one input device further comprises a remote server spaced from the vehicle and electronically communicating with the at least one processor of the computer, where the remote server stores ground truth data and the at least one processor is further programmed to determine a plurality of regression coefficients for the error model based on the ground truth data received from the remote server and the image sensor data received from camera.

13. A computer for a vehicle system in an autonomously controlled vehicle that corrects in real-time a camera-based estimated position of a road object and facilitates a Global Navigation Satellite System (GNSS), with the vehicle system having a camera and at least one input device, the computer comprising:
    at least one processor electronically communicating with the camera and receiving an image input signal from the camera, with the image input signal associated with image sensor data collected by the camera and the image sensor data being associated with the road object, and the at least one processor electronically communicating with the at least one input device and receiving a vehicle input signal from the at least one input device, with the vehicle input signal associated with vehicle sensor data collected by the camera, and the vehicle sensor data being associated with a current vehicle position, a current vehicle speed, and a current vehicle heading; and
    a non-transitory computer readable storage medium storing instructions such that the at least one processor is programmed to:
       receive the image input signal from the camera and the vehicle input signal from the at least one input device;
       match the image sensor data and the vehicle sensor data to one another based on a common time of collection by the associated camera and the associated at least one input device;
       determine an error model based on the image sensor data and the vehicle sensor data that are matched to one another;
       determine a predicted position of the road object based on the error model, the current vehicle position, the current vehicle speed, and the current vehicle heading;
       determine a current camera-based position of the road object based on the image sensor data;
       determine a deviation of the current camera-based position from the predicted position;
       update the error model based on the deviation by removing a plurality of outlier intersections and determining a mean to reduce an error in the current camera-based position, such that the GNSS is capable of correcting an error in an absolute position of the road object; and
       control the vehicle autonomously based on the updated error model.

14. The computer of claim 13 wherein the at least one processor is further programmed to:
    compare an offset distance between the vehicle and the road object to an offset threshold in response to the at least one processor receiving an offset input signal from a LIDAR sensor; and
    match the image sensor data and the vehicle sensor data to one another in response to the at least one processor determining that the offset distance is below the offset threshold.

15. The computer of claim 14 wherein the at least one processor is further programmed to determine a linear regression model for a longitudinal direction of the vehicle to calculate a corrected longitudinal distance between the vehicle and the road object, based on the offset distance, the current vehicle speed, and a current vehicle acceleration.

16. The computer of claim 15 wherein the at least one processor is further programmed to determine the linear regression model for a lateral direction of the vehicle to calculate a corrected lateral distance between the vehicle and the road object, based on the offset distance, the current vehicle speed, and the current vehicle acceleration.

17. A method for operating a computer of a vehicle system of an autonomously controlled vehicle that corrects in real-time a camera-based estimated position of a road object and facilitates a Global Navigation Satellite System (GNSS), the computer having at least one processor and a non-transitory computer readable storage medium (CRM) storing instructions, the method comprising:
    receiving, using the at least one processor, an image input signal from a camera, with the image input signal including image sensor data that is in turn associated with the road object;
    receiving, using the at least one processor, a vehicle input signal from at least one input device, with the vehicle input signal including vehicle sensor data that is in turn associated with a current vehicle position, a current vehicle speed, and a current vehicle heading;

matching, using the at least one processor, the image sensor data and the vehicle sensor data to one another based on a common time of collection by the associated camera and the associated at least one input device;

determining, using the at least one processor, an error model based on the image sensor data and the vehicle sensor data that are matched to one another;

determining, using the at least one processor, a predicted position of the road object based on the error model, the current vehicle position, the current vehicle speed, and the current vehicle heading;

determining, using the at least one processor, a current camera-based position of the road object based on the image sensor data;

determining, using the at least one processor, a deviation of the current camera-based position from the predicted position;

updating, using the at least one processor, the error model based on the deviation by removing a plurality of outlier intersections and determining a mean, such that the GNSS is capable of correcting an error in an absolute position of the road object; and controlling the vehicle autonomously based on the updated error model.

18. The method of claim 17 further comprising:

comparing, using the at least one processor, an offset distance between the vehicle and the road object to an offset threshold in response to the at least one processor receiving an offset input signal from a LIDAR sensor; and matching, using the at least one processor, the image sensor data and the vehicle sensor data to one another in response to the at least one processor determining that the offset distance is below the offset threshold.

19. The method of claim 18 further comprising:

determining, using the at least one processor, a linear regression model for a longitudinal direction of the vehicle to calculate a corrected longitudinal distance between the vehicle and the road object, based on the offset distance, the current vehicle speed, and a current vehicle acceleration.

20. The method of claim 19 further comprising:

determining, using the at least one processor, the linear regression model for a lateral direction of the vehicle to calculate a corrected lateral distance between the vehicle and the road object, based on the offset distance, the current vehicle speed, and the current vehicle acceleration.

* * * * *